June 4, 1963 W. C. MORRIS 3,092,758
POLYPHASE ELECTROMAGNETIC PROTECTIVE RELAY
Filed Sept. 12, 1960

Inventor:
William C. Morris
by Irving H. Marshman
Attorney.

3,092,758
POLYPHASE ELECTROMAGNETIC
PROTECTIVE RELAY
William C. Morris, Havertown, Pa., assignor to General
Electric Company, a corporation of New York
Filed Sept. 12, 1960, Ser. No. 55,494
10 Claims. (Cl. 317—27)

This invention relates to a polyphase electromagnetic protective relay, and more particularly it relates to an electromagnetic induction type relay which is responsive to predetermined magnitude relationships among three A.-C. electric quantities.

There is a growing need in the art of protective relaying for a relay which is responsive to predetermined magnitude relationships among several different, out-of-phase A.-C. electric quantities while being relatively insensitive to their phase relationships. A relay having such characteristics can be used, for example, to perform a fault detecting function in a polyphase electric power transmission system. In this connection it is desirable to have a single relay which will operate in response to any kind of fault (phase-to-ground or phase-to-phase short circuit) involving any one or more phases of the system.

A typical application for polyphase fault detectors is found in circuit breaker failure "back-up" protective relaying schemes. See, for example, "An Appraiser of Remote and Local Back-up Relaying" by L. F. Kennedy and A. J. McConnell published in 76 AIEE Transactions Pt. III, pages 735–41 (1957). The relay of the present invention is suitable for performing the functions of the selector relays mentioned in the cited article. More particularly, it is used to detect a failed circuit breaker and to select the back-up breakers to be opened in order to isolate the fault. In this particular application it is important that the fault detecting relay be capable of continuous operation in the "pick up" position.

It is a general object of the present invention to provide an improved electromagnetic induction type relay capable of polyphase magnitude response yet having only a single current conducting rotor.

A more specific object of the invention is the provision of a compact, high-speed electromagnetic polyphase overcurrent relay.

In carrying out my invention in one form, I provide an electromagnetic relay comprising a frame or stator having a plurality of salient poles projecting therefrom and a magnetizable core spaced apart from the extremities of the poles to define therewith a plurality of gaps. A single current conducting rotor is disposed for rotation through said gaps. A plurality of magnetic flux producing windings are provided on the stator, and these windings are adapted to be energized by three A.-C. electric quantities, respectively. Appropriate means are provided for retarding the magnetic flux produced by predetermined ones of the windings. As a result of the interactions of the magnetic fields established in the gaps by the energized windings, driving torque is established in the rotor, and I so arrange the windings on the stator that the three principal components of the driving torque are respectively proportional to the squared magnitudes of each one of the three energizing quantities.

My invention will be better understood and its various objects and advantages will be more fully appreciated from the following description taken in conjunction with the accompanying drawing in which.

Figure 1:
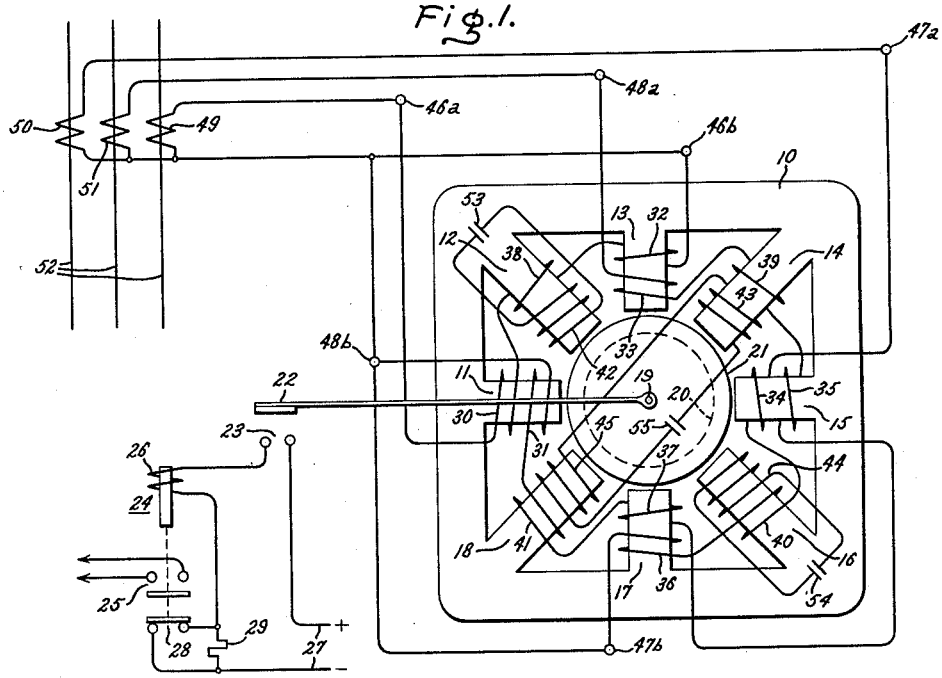
FIG. 1 is a schematic diagram of one embodiment of my invention.

Refer now to the drawing, the illustrated embodiments of my invention each comprise a frame structure or stator 10 constructed of laminated magnetizable material and having eight consecutively disposed spaced-apart salient poles 11, 12, 13, 14, 15, 16, 17, and 18. The body of stator 10 forms a closed magnetic path or loop. Preferably the poles project from the stator body toward a centrally located axis 19 and terminate in inwardly disposed concave pole faces.

A magnetizable member or core 20 is located intermediate the salient poles 11—18 and is spaced apart from their extremities to define therewith eight gaps which are symmetrically located with respect to the axis 19. The core 20, which preferably is a cylindrically-shaped member physically annexed to the stator, provides a common link in the complete magnetic circuit for magnetic flux issuing from the extremities of the various poles.

An electroconductive armature or rotor 21 is mounted pivotally on axis 19 for 360 degrees rotation through the gaps formed by core 20 and the faces of the eight stator poles 11—18. A portion of the surface of this current conducting induction element 21, which preferably is a light-weight cup-shaped member fitting loosely on the cylindrical core 20, extends into the gaps for movement in a direction generally parallel to the pole faces, and thus the current conducting path provided by the rotor lies substantially transverse to the magnetic fields between the core and the respective pole faces. The rotor 21 is actuatable in either direction by driving torque created by the interaction of the magnetic fields in the rotor. Rotation of the rotor in a counterclockwise direction, as illustrated in the drawing, carries a movable switch contact 22 into engagement with a pair of co-operating fixed contacts 23 thereby to perform a circuit controlling operation.

The circuit controlling operation may comprise, as is shown in FIG. 1 by way of example, the energization of an auxiliary relay 24 having one or more electrically separate normally open switch contacts 25. Upon counter-clockwise movement of the rotor 21 to carry movable contact 22 into engagement with contacts 23, an energizing circuit is completed between the operating winding 26 of auxiliary relay 24 and a suitable source of electric power 27. The energizing circuit includes a normally closed contact 28 of the auxiliary relay, and when this contact opens upon energization of the relay a resistor 29 is inserted in circuit with the operating winding 26 in order to enable the auxiliary relay to operate continuously in its energized or "pick up" position.

The mechanical structure of the relatively compact stator and rotor shown in the drawing and described above is well known in the art, as is exemplified by the structure described in United States Patent Re. 21,813 reissued on May 27, 1941 to Victor E. Verrall. It should be clearly understood, however, that my invention is not limited by the use of this particular relay construction.

As can be seen in the drawing, a plurality of electric windings are disposed on the stator 10. There are twelve magnetic flux producing primary windings and four shading windings. A first group of eight primary windings 30—37 are disposed in pairs on four alternate poles of the stator: windings 30 and 31 being disposed on the salient pole 11; windings 32 and 33 being disposed on the salient pole 13; windings 34 and 35 being disposed on the salient pole 15; and windings 36 and 37 being disposed on salient pole 17. The second group of four primary windings 38, 39, 40 and 41 are singularly arranged on the four intermediate poles 12, 14, 16 and 18, respectively, of the stator. The four shady windings 42, 43, 44 and 45 are respectively associated with the primary windings 38—41 disposed on the intermediate poles of the stator.

As can be seen in the drawing, three primary windings 30, 38 and 32 which are mounted on the consecutively disposed poles 11, 12 and 13 are serially connected to a first pair of input terminals 46a and 46b. Another three primary windings 34, 40 and 36 respectively mounted on another three consecutively disposed poles 15, 16 and 17 are serially connected to a second pair of input terminals 47a and 47b. The middle pole 16 of the last-mentioned consecutive poles is so disposed in relation to the middle pole 12 of the first-mentioned consecutive poles that both are intersected by a common axial plane. That is, poles 12 and 16 are on diammetrically opposite sides of the rotor 21.

The six other primary windings 33, 39, 35, 37, 41 and 31, which are respectively mounted on alternate pole 13, intermediate pole 14, alternate poles 15 and 17, intermediate pole 18, and alternate pole 11, are all serially connected to a third pair of input terminals 48a and 48b. In order to supply the three pairs of input terminals 46a–b, 47a–b, and 48a–b with three A.-C. energizing quantities, appropriate connections are made from the input terminals to a set of three star-connected current transformers 49, 50 and 51. The current transformers are associated with three conductors 52 of a 3-phase, 3-wire alternating current electric power transmission system, and they derive electric quantities respectively proportional to the different phase currents of the system.

In the FIG. 1 embodiment of my invention, the three current transformers 49, 50 and 51 are connected across the three pairs of input terminals 46a–b, 47a–b and 48a–b respectively, with the neutral or common point of the current transformers being connected to all three of the "b" input terminals 46b, 47b and 48b. With this arrangement, the three interconnected primary windings 30, 38 and 32 of the relay are energized in accordance with a first phase current, the six interconnected primary windings 33, 39, 35, 37, 41 and 31 of the relay are energized in accordance with a second phase current; and the three interconnected primary windings 34, 40 and 36 are energized in accordance with the third phase current.

Figure 2:
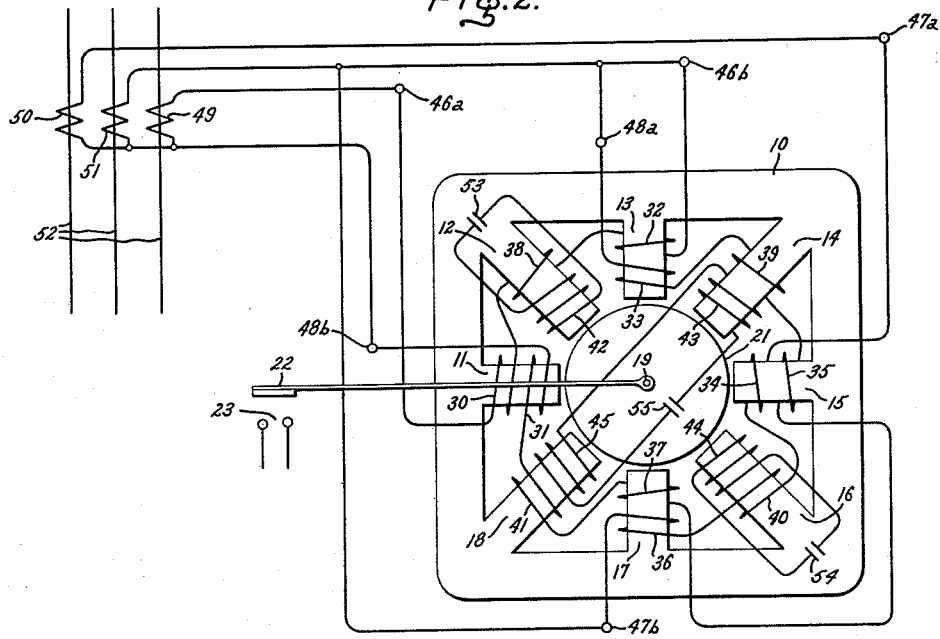
FIG. 2 is a schematic diagram of another embodiment of my invention.

The FIG. 2 embodiment of my invention is virtually the same as FIG. 1 with the exception of the connections made between the three pairs of input terminals and the three star-connected current transformers. Here the current transformers 49 and 50 are again connected to the input terminals 46a and 47a, respectively, but the pair of input terminals 48a and 48b are connected, as can be seen in FIG. 2, so that the six interconnected primary windings 33, 39, 35, 37, 41 and 31 are energized by the neutral or residual current of the current transformers. This is accomplished by connecting terminals 46b and 47b, along with current transformer 51, to the input terminal 48a instead of to the common point of the three current transformers.

Preferably, the shading windings 42—45, which are mounted on the intermediate poles of the stator 10, have phase shifting capacitors connected in series therewith. Thus a capacitor 53 is connected in series with shading winding 42, a capacitor 54 is connected in series with shading winding 44, and a capacitor 55 is connected in series with both of the shading windings 43 and 45. The function of each of the shading windings is to shade or retard the magnetic flux produced by the associated primary winding which is disposed on the same intermediate pole, for reasons which will be made clear hereinafter. This retarding effect, as will be clearly understood by those skilled in the art, could also be achieved by means conductively associated with the same primary windings instead of the inductively associated shading windings illustrated in the drawing.

The various windings on the stator 10 preferably are arranged so that their respective numbers of turns are interrelated by predetermined ratios which will now be considered. The primary windings 30 and 32 which are respectively disposed on the alternate poles 11 and 13 and connected to the input terminals 46a and 46b, and the primary windings 34 and 36 which are respectively disposed on the alternate poles 15 and 17 and connected to the input terminals 47a and 47b, are each provided with the same number of turns $N_1$. The primary windings 38 and 40 respectively disposed on the intermediate poles 12 and 16 have equal turns $N_2$. Each of the primary windings 33, 35, 37 and 31, which are respectively disposed on the alternate poles 13, 15, 17 and 11 and are connected between input terminals 48a and 48b, has the same number of turns $N_3$. Each of the primary windings 39 and 41 respectively disposed on the intermediate poles 14 and 18 has the same number of turns $N_4$. The shading windings 43 and 45 mounted on the intermediate poles 14 and 18 are each provided with $N_5$ turns, while each of the other two shading windings 42 and 44, respectively disposed on the intermediate poles 12 and 16, is wound with twice this number of turns, namely $2N_5$.

The various primary windings on the stator 10 preferably are arranged to have predetermined relative magnetization polarities. The desired relative polarities are obtained by appropriately interconnecting the serially related windings between the respective pairs of input terminals, as is shown in the drawing. In this connection it will be assumed that the energizing current flowing in a primary winding is positive or in a forward instantaneous direction whenever the associated "a" input terminal is positive with respect to the "b" terminal. A winding energized by positive current will be considered to have positive or plus magnetic polarity if the instantaneous direction of the magnetic flux produced is from the pole face toward the core of the relay stator.

In accordance with my invention, the windings 30 and 32 mounted on alternated poles 11 and 13, respectively, are arranged to have opposite magnetic polarities (windings 32 being plus and 30 being "minus" or negative) The windings 34 and 36 mounted on alternate poles 15 and 17, respectively, are also arranged to have opposite magnetic polarities (winding 34 being plus and winding 36 being minus). The primary windings 39 and 41 mounted on the intermediate poles 14 and 18, respectively, have opposite magnetic polarities (winding 39 being plus and winding 41 being minus).

The magnetic polarity of the primary winding 33 mounted on pole 13 is opposite to that of winding 32 mounted on the same pole, while the polarity of winding 31 on pole 11 corresponds to the polarity of winding 30 on this pole, both being minus. The two primary windings 34 and 35 mounted on pole 15 are arranged to have corresponding magnetic polarities (both plus), while the windings 36 and 37 on pole 17 have opposite polarities (winding 37 being plus). It will be observed that of the four primary windings 33, 35, 37 and 31 mounted on the four alternate poles of the stator and connected to the input terminals 48a–b, the two (31 and 33) associated with the two companion poles 11 and 13 have the same polarity (minus) and each of the two (35 and 37) associated with the companion poles 15 and 17 is of the opposite polarity (plus).

The magnetic fluxes produced upon energization of the various primary windings disposed on the poles of stator 10 establish magnetic fields in the eight gaps formed between the pole faces and the stator core 20. As is well known to those skilled in the art, these magnetic fields, to the extent there is some phase displacement therebetween, interact in the rotor 21 to create a driving torque for actuating the rotor and hence closing the cooperating switch contacts 22 and 23. The shading windings 42—45, with their interconnected capacitors 53—55, are provided in order to obtain the necesary phase displacement between magnetic fluxes produced by windings on adjacent poles energized by the same electric quantity. The net torque acting on the rotor 21 is the sum of the torque components contributed by the interaction of the magnetic fields in various different pairs of gaps.

The principal components of the net torque are those created by the interactions of magnetic fields in adjacent gaps. The amount of torque contributed by the interaction of magnetic fields in alternate gaps (those spaced 90 angular degrees apart) is relatively small and will not exceed more than about 15 percent of the total. For the fault detecting application of my invention, as it is presently contemplated, the relatively minor torque components contributed by the quardature fields has no practical effect and can be ignored, and hence in the description to follow only the principal components of torque will be analyzed.

As is well known to those skilled in the art, the magnitude of torque created by the interaction of out-of-phase magnetic fields in adjacent gaps is proportional to the product of the respective ampere-turns of the primary windings producing the magnetic fields, and the direction of the torque is physically from the gap of the leading flux to the gap of lagging flux as long as the respective primary windings have corresponding magnetic polarities. The ampere-turns establishing the magnetic fields in the eight gaps of the illustrated relay are set forth in the following table, where $I_1$, and $I_2$ and $I_3$ represent the normally out-of-phase electric currents flowing through the primary windings connected to the input terminals 46a–b, 48a–b and 47a–b, respectively.

| Gap at end of Pole: | Ampere-turns producing magnetic field |
|---|---|
| 11 | $-I_1N_1-I_2N_3$ |
| 12 | $+I_1N_2$ |
| 13 | $+I_1N_1-I_2N_3$ |
| 14 | $+I_2N_4$ |
| 15 | $+I_3N_1+I_2N_3$ |
| 16 | $-I_3N_2$ |
| 17 | $-I_3N_1+I_2N_3$ |
| 18 | $-I_2N_4$ |

The plus and minus signs in the foregoing table are in accordance with the relative polarities of the various windings. The sum of the products of the ampere-turns of each pair of adjacent poles reduce to the following expression for the driving torque acting on the relay rotor 21 (the net torque acting in a counterclockwise direction):

$$T \alpha I_1^2 + K I_2^2 + I_3^2$$

where the constant $$K = \frac{2N_3N_4}{N_1N_2}$$

From the foregoing it is apparent that the three principal components of the driving torque of my relay are respectively proportional to the squared magnitudes of each one of the three electric quantities which energize the various primary windings. In FIG. 1 embodiment of the invention preferably the constant K is made equal to 1 by selecting $N_1N_2 = 2N_3N_4$. With this arrangement, if A amperes are required in order to operate the relay under any single-phase-to-ground fault condition in the protected system represented by conductors 52, then $$\frac{A}{\sqrt{2}}$$

amperes will operate the relay upon the occurrence of any phase-to-phase fault condition and $$\frac{A}{\sqrt{3}}$$

amperes will cause relay operation under a 3-phase fault condition.

By making K greater than 1, the FIG. 2 embodiment of my invention can be designed so that it is more sensitive on ground faults than it is on phase-to-phase or 3-phase faults.

While I have shown and described a preferred form of my invention by way of illustration, many modifications will occur to those skilled in the art. I contemplate, therefore, by the claims which conclude this specification to cover all such modifications as fall within the true spirit and scope of my invention.

What I claim as new and desire to secure by Letters Patent of the United States is:

1. An electromagnetic induction type relay responsive to predetermined magnitude relationships among three A.-C. electric quantities comprising: a magnetizable stator having a plurality of salient poles projecting therefrom; a magnetizable member spaced apart from the extremities of said poles to define therewith a plurality of gaps; a single current conducting rotor disposed for rotation through said gaps; and a plurality of magnetic flux producing windings on said stator energizable by the three electric quantities, respectively, for establishing magnetic fields in said gaps; at least one, but less than all, of the windings which are energized by each one of the three electric quantities having associated therewith means for retarding the magnetic flux produced thereby; said rotor having driving torque induced therein by the interactions of said magnetic fields, and said windings being arranged whereby the three principal components of said driving torque are respectively proportional to the squared magnitudes of each one of said three electric quantities.

2. An electromagnetic polyphase overcurrent relay adapted to be energized in accordance with the three phase currents of a 3-phase A.-C. electric power system comprising: a magnetizable structure having eight poles projecting therefrom and a core disposed in spaced apart relation with the faces of said poles; a movable current conducting circuit controlling element extending into the gaps formed by said core and pole faces; twelve magnetic flux producing windings disposed on said structure, three of said windings being interconnected for energization in accordance with the first phase current, another six of said windings being interconnected for energization in accordance with the second phase current, and the remaining three of said windings being interconnected for energization in accordance with the third phase current; and means associated with a predetermined four of said twelve windings to retard magnetic flux produced by windings energized in accordance with each of the three phase currents; said windings being disposed to establish, when energized, magnetic fields in said gaps for inducing a driving force in said element.

3. In an electromagnetic relay adapted to be energized by three A.-C. quantities derived from a 3-wire electric power circuit, the three A.-C. quantities being normally out-of-phase with respect to each other: a magnetizable structure having eight poles projecting therefrom; a magnetizable member disposed in spaced apart relation with the faces of said poles; a movable current conducting element extending into the gaps formed by said magnetizable member and pole faces for movement in a direction generally parallel to said pole faces; a first group of eight magnetic flux producing windings disposed in pairs on four alternate poles of said structure; a second group of four magnetic flux producing windings respectively disposed on four intermediate poles of said structure; two windings of said first group and one winding of said second group being interconnected for energization by a first one of the three A.-C. quantities, two other windings of said first group and another winding of said second group being interconnected for energization by the second one of the A.-C. quantities, and the remaining four windings of said first group and the remaining two windings of said second group being interconnected for energization by a third A.-C. quantity; and means associated with the windings of said second group for retarding the magnetic flux produced by each of the second group windings; said magnetic flux producing windings being arranged so that the driving force produced in said element as a result of the interactions of magnetic fluxes issuing from each pair of adjacent poles of the structure is dependent solely upon the squares of the magnitudes of the respective A.-C. quantities.

4. In a circuit controlling electromagnetic induction relay responsive to the magnitudes of three A.-C. electric quantities; an axis; a magnetizable frame including a core and a plurality of poles whose extremities are spaced from said core to define therewith a plurality of gaps symmetrically located with respect to said axis; a circuit controlling induction element axially supported for movement through said gaps in a direction generally transverse to the lines of magnetic flux between said poles and said core; three pairs of input terminals respectively supplied by the three electric quantities; and a plurality of magnetic flux producing primary windings, three of said primary windings being serially connected to a first pair of said input terminals and being respectively mounted on first, second and third consecutively disposed poles of said frame, another three windings of said plurality of windings being serially connected to a second pair of said input terminals and being respectively mounted on fourth, fifth and sixth consecutively disposed poles of said frame, said second and fifth poles being so disposed in relation to each other that both are intersected by a common axial plane, and six other windings of said plurality of primary windings being serially connected to the third pair of input terminals and being respectively mounted on the first, third, fourth and sixth poles, on a seventh pole of said frame disposed intermediate said third and fourth poles, and on an eighth pole of said frame disposed intermediate said sixth and first poles.

5. The relay of claim 4 in which a plurality of shading windings are respectively disposed on the second, fifth, seventh and eighth poles of said frame to retard the magnetic flux produced by the respective primary windings mounted on the same poles.

6. An electromagnetic relay responsive to predetermined magnitude relationships among three input electric quantities comprising: a magnetizable stator having eight poles and a core spaced apart from the extremities of said poles to define gaps therewith; a current conducting rotor disposed for rotation through said gaps, said gaps being symmetrically disposed with respect to the axis of rotation of said rotor; a plurality of magnetic flux producing windings mounted on the poles of said stator, said windings being arranged in pairs on each of four alternate poles and singularly on each of four poles disposed intermediate to said alternate poles; means serially interconnecting a first three of said windings respectively mounted on one of said intermediate poles and on the two alternate poles adjacent thereto for energization by one of the three input quantities, the two windings mounted on said two alternate poles being arranged to have opposite magnetic polarities; means serially interconnecting a second three of said windings respectively mounted on the other two alternate poles and on the intermediate pole disposed therebetween, for energization by another input quantity, the two windings mounted on said other two alternate poles being arranged to have opposite magnetic polarities; means serially interconnecting another six of said windings respectively mounted on all four alternate poles and on the other two intermediate poles, for energization by the third input quantity, the two windings mounted on said other two intermediate poles being arranged to have opposite magnetic polarities; and means associated with each of the windings mounted on the four intermediate poles for retarding the magnetic fluxes produced upon energization of these windings.

7. The relay of claim 6 in which the two windings mounted on a first one of the two alternate poles disposed adjacent to said one intermediate pole are arranged to have opposite magnetic polarities, the two windings mounted on the companion one of said two alternate poles are arranged to have corresponding magnetic polarities, the two windings mounted on a first one of said other two alternate poles are arranged to have opposite magnetic polarities, and the two windings mounted on the companion one of said other two alternate poles are arranged to have corresponding magnetic polarities.

8. The relay of claim 7 in which two of the six windings energized by the third input quantity and mounted on alternate poles of the stator are arranged so that their magnetic polarities are opposite to the magnetic polarities of the other two of said six windings also mounted on alternate poles.

9. An electromagnetic relay responsive to predetermined magnitude relationships among three input electric quantities comprising: a magnetizable stator having eight poles and a core spaced apart from the extremities of said poles to define gaps therewith; a current conducting rotor disposed for rotation through said gaps, said gaps being symmetrically disposed with respect to the axis of rotation of said rotor; twelve magnetic flux producing windings mounted on the poles of said stator, said windings being arranged in pairs on each of four alternate poles and singularly on each of four poles disposed intermediate to said alternate poles; means serially interconnecting the first three of said windings respectively mounted on one of said intermediate poles and on the two alternate poles adjacent thereto for energization by one of the three input quantities, the two windings mounted on said two alternate poles being arranged to have the same predetermined number of turns but opposite magnetic polarities; means serially interconnecting a second three of said windings respectively mounted on the other two alternate poles and on the intermediate pole disposed therebetween for energization by another input quantity, the two windings mounted on said other two alternate poles each having said predetermined number of turns and having opposite magnetic polarities, the other winding of said second three having the same number of turns as the winding of said first three mounted on said one intermediate pole; means serially interconnecting the other six of said windings respectively mounted on all four alternate poles and on the other two intermediate poles for energization by the third input quantity, the four windings of said other six mounted on alternate poles having equal turns and the two windings mounted on said other two intermediate poles being arranged to have equal turns but opposite polarities; and means associated with each of the windings mounted on the four intermediate poles for retarding the magnetic flux produced upon energization of these windings.

10. An electromagnetic relay responsive to the magnitudes of a plurality of normally out-of-phase A.-C. input electric quantities comprising: a magnetizable stator including a core and at least seven poles whose extremities are spaced from said core to define therewith a plurality of gaps; a circuit controlling induction element disposed for movement through said gaps; a plurality of magnetic flux producing windings mounted on the poles of said stator, a first two of said windings having equal turns and opposite polarities being mounted on alternate poles, third and fourth windings of said plurality of windings having equal turns and corresponding polarities being also mounted on said alternate poles; means connecting said first two windings in series circuit relationship with a fifth winding of said plurality of windings mounted on the pole intermediate to said alternate poles for energization by one of said input quantities; means connecting said third and fourth windings in series circuit relationship with windings mounted on each of four other poles of said stator for energization in accordance with another input quantity, the two of said last-mentioned windings which are mounted on poles disposed adjacent to said alternate poles having equal turns and opposite polarities; and means associated with the windings mounted on said adjacent poles and said intermediate pole for retarding the magnetic flux produced upon energization of these windings.

References Cited in the file of this patent

UNITED STATES PATENTS 2,303,329    McConnell _____ Aug. 21, 1945

FOREIGN PATENTS 720,020    Great Britain _____ Dec. 15, 1954